US012688410B2

(12) United States Patent
Velickovic et al.

(10) Patent No.: US 12,688,410 B2
(45) Date of Patent: Jul. 21, 2026

(54) GENERATING PREDICTION OUTPUTS USING DYNAMIC GRAPHS

(71) Applicant: GDM Holding LLC, Mountain View, CA (US)

(72) Inventors: Petar Velickovic, Cambridge (GB); Charles Blundell, London (GB); Oriol Vinyals, London (GB); Razvan Pascanu, Letchworth Garden City (GB); Lars Buesing, Letchworth Garden City (GB); Matthew Overlan, London (GB)

(73) Assignee: GDM Holding LLC, Mountain View, CA (US)

( * ) Notice: Subject to any disclaimer, the term of this patent is extended or adjusted under 35 U.S.C. 154(b) by 1138 days.

(21) Appl. No.: 17/338,974

(22) Filed: Jun. 4, 2021

(65) Prior Publication Data

US 2021/0383228 A1      Dec. 9, 2021

Related U.S. Application Data

(60) Provisional application No. 63/035,449, filed on Jun. 5, 2020.

(51) Int. Cl.
G06N 3/08           (2023.01)
G06F 16/23          (2019.01)
             (Continued)

(52) U.S. Cl.
CPC ........... G06N 3/08 (2013.01); G06F 16/2379 (2019.01); G06F 16/9024 (2019.01); G06N 3/04 (2013.01)

(58) Field of Classification Search
CPC . G06N 3/04; G06N 3/08; G06N 3/042; G06F 16/2379; G06F 16/9024
See application file for complete search history.

(56) References Cited

U.S. PATENT DOCUMENTS

| | | | |
|---|---|---|---|
| 2016/0267397 A1* | 9/2016 | Carlsson | G06N 3/04 |
| 2020/0074246 A1* | 3/2020 | Goyal | G06N 3/088 |
| 2021/0081717 A1* | 3/2021 | Creed | G06N 3/047 |

FOREIGN PATENT DOCUMENTS

WO      WO-2019081781 A1 *   5/2019   ......... G06F 16/9024

OTHER PUBLICATIONS

J Wu et al., Dynamic Graph Convolutional Networks for Entity Linking, Proceedings of The Web Conference 2020, Apr. 20-24, 2020 (Year: 2020).*

(Continued)

*Primary Examiner* — Markus A. Vasquez
(74) *Attorney, Agent, or Firm* — Fish & Richardson P.C.

(57)           ABSTRACT

Methods, systems, and apparatus, including computer programs encoded on a computer storage medium, for generating prediction outputs characterizing a set of entities. In one aspect, a method comprises: obtaining data defining a graph, comprising: (i) a set of nodes, wherein each node represents a respective entity from the set of entities, (ii) a current set of edges, wherein each edge connects a pair of nodes, and (iii) a respective current embedding of each node; at each of a plurality of time steps: updating the respective current embedding of each node, comprising processing data defining the graph using a graph neural network; and updating the current set of edges based at least in part on the updated embeddings of the nodes; and at one or more of the plurality of time steps: generating a prediction output characterizing the set of entities based on the current embeddings of the nodes.

20 Claims, 5 Drawing Sheets

(51) Int. Cl.
G06F 16/901      (2019.01)
G06N 3/04      (2023.01)

(56) References Cited

OTHER PUBLICATIONS

S M Kazemi et al., Representation Learning for Dynamic Graphs: A Survey, J of Machine Learning Research, vol. 21 (2020), pp. 1-73 (Year: 2020).*

W Kool, et al., Attention, Learn to Solve Routing Problems, published as a conference paper at ICLR 2019. https://arxiv.org/pdf/1803.08475 (Year: 2019).*

F Zhu, Improved collective influence of finding most influential nodes based on disjoint-set reinsertion, Scientific Reports (2018) 8:14503 (https://www.nature.com/articles/s41598-018-32874-5.pdf) (Year: 2018).*

Battaglia et al., "Interaction networks for learning about objects, relations and physics," CoRR, arxiv.org/abs/1612.00222, Dec. 2016, 12 pages.

Chen et al., "Can graph neural networks count substructures?," CoRR, Feb. 2020, arXiv:2002.04025, 42 pages.

Chen et al., "Measuring and relieving the over-smoothing problem for graph neural networks from the topological view," CoRR, Sep. 2019, arXiv:1909.03211, 12 pages.

Deac et al., "Graph neural induction of value iteration," CoRR, Sep. 2020, arxiv.org/abs/2009.12604, 5 pages.

Dinitz, "Algorithm for solution of a problem of maximum flow in networks with power estimation," Soviet Math. Dokl., Jan. 1970, 11(5):1277-1280.

Dwivedi et al., "Benchmarking graph neural networks," CoRR, Mar. 2020, arXiv:2003.00982, 30 pages.

Franceschi et al., "Learning discrete structures for graph neural networks," CoRR, Mar. 2019, arXiv:1903.11960, 14 pages.

Fredman et al., "The cell probe complexity of dynamic data structures," Proceedings of the twenty-first annual ACM symposium on Theory of computing, Feb. 1989, pp. 345-354.

Galler et al., "An improved equivalence algorithm," Communications of the ACM, May 1964, 7(5):301-303.

Garg et al., "Generalization and representational limits of graph neural networks," Proceedings of the 37th International Conference on Machine Learning, 2020, 119:3419-3430.

Georgiev et al., "Neural bipartite matching," CoRR, May 2020, arxiv.org/abs/2005.11304, 6 pages.

Gilmer et al., "Neural message passing for quantum chemistry," Proceedings of the 34th International Conference on Machine Learning, 2017, 70:1263-1272.

Github.com [online], "Composable transformations of Python+NumPy programs: differentiate, vectorize, JIT to GPU/TPU, and more," Sep. 2020, retrieved on May 19, 2021, retrieved from URL<https://github.com/google/jax>, 12 pages.

Goel et al., "Disjoint set union with randomized linking," Proceedings of the 2014 Anual ACM-SIAM Symposium on Discrete Algorithms, 2014, pp. 1005-1017.

Grover et al., "Graphite: Iterative generative modeling of graphs," CoRR, Mar. 2018, arXiv:1803.10459, 13 pages.

Hamrick et al., "Relational inductive bias for physical construction in humans and machines," CoRR, Jun. 2018, arXiv:1806.01203, 7 pages.

Jiang et al., "Semi-supervised learning with graph learning-convolutional networks," Proceedings of the IEEE/CVF Conference on Computer Vision and Pattern Recognition, 2019, pp. 11313-11320.

Kaiser et al., "Neural GPUs learn algorithms," CoRR, Nov. 2015, arXiv:1511.08228, 9 pages.

Kazi et al., "Differentiable graph module (DGM) graph convolutional networks," CoRR, Feb. 2020, arXiv:2002.04999, 10 pages.

Kingma et al., "Adam: A method for stochastic optimization," CoRR, Dec. 2014, arXiv:1412.6980, 15 pages.

Kipf et al., "Neural relational inference for interacting systems," CoRR, Feb. 2018, arXiv:1802.04687, 17 pages.

Kitaev et al., "Reformer: The efficient transformer," CoRR, Jan. 2020, arXiv:2001.04451, 12 pages.

Kool et al., "Attention, learn to solve routing problems!," CoRR, Mar. 2018, arXiv:1803.08475, 25 pages.

Kruskal, "On the shortest spanning subtree of a graph and the traveling salesman problem," Proceedings of the American Mathematical Society, Feb. 1956, 7(1):48-50.

Li et al., "Learning deep generative models of graphs," CoRR, Mar. 2018, arXiv:1803.03324, 21 pages.

Liu et al., "Non-local graph neural networks," CoRR, May 2020, arXiv:2005.14612, 13 pages.

Pritzel et al., "Neural episodic control," Proceedings of the 34th International Conference on Machine Learning, 2017, 70:2827-2836.

Richter et al., "Normalized attention without probability cage," CoRR, May 2020, arXiv:2005.09561, 22 pages.

Sanchez-Gonzalez et al., "Learning to simulate complex physics with graph networks," CoRR, Feb. 2020, arXiv:2002.09405, 20 pages.

Santoro et al., "A simple neural network module for relational reasoning," CoRR, Jun. 2017, arxiv.org/abs/1706.01427, 16 pages.

Serviansky et al., "Set2graph: Learning graphs from sets," CoRR, Feb. 2020, arXiv:2002.08772, 19 pages.

Shiloach et al., "An on-line edge-deletion problem," Journal of the ACM, Jan. 1981, 28(1):1-4.

Sleator et al., "A data structure for dynamic trees," Journal of computer and system sciences, Jun. 1983, 26(3):362-391.

Stanley, "Acyclic orientations of graphs," Discrete Mathematics, May 2006, 306(10-11):905-909.

Tang et al., "Towards Scale-Invariant Graph-related Problem Solving by Iterative Homogeneous GNNs," CoRR, Oct. 2020, arxiv.org/abs/2010.13547, 37 pages.

Tarjan et al., "Dynamic trees in practice," Journal of Experimental Algorithmics, Sep. 2009, 14(4.5):21 pages.

Tarjan et al., "Efficiency of a good but not linear set union algorithm," Journal of the ACM, Apr. 1975,22(2):215-225.

Tarjan et al., "Finding biconnected components and computing tree functions in logarithmic parallel time," 25th Annual Symposium on Foundations of Computer Science, Oct. 1984, pp. 12-20.

Tarjan et al., "Worst-case analysis of set union algorithms," Journal of the ACM, Apr. 1984, 31(2):245-281.

Trask et al., "Neural arithmetic logic units," CoRR, Aug. 2018, arxiv.org/abs/1808.00508, 15 pages.

Vaswani et al., "Attention is all you need," CoRR, Jun. 2017, arxiv.org/abs/1706.03762, 15 pages.

Velickovic et al., "Graph attention networks," CoRR, Oct. 2017, arXiv:1710.10903, 12 pages.

Velickovic et al., "Neural execution of graph algorithms," CoRR, Oct. 2019, arXiv:1910.10593, 14 pages.

Velickovic et al., "Pointer Graph Networks," CoRR, Oct. 2020, arXiv:2006.06380v2, 21 pages.

Vinyals et al., "Order matters: Sequence to sequence for sets," CoRR, Nov. 2015, arXiv:1511.06391, 11 pages.

Vinyals et al., "Pointer networks," CoRR, Jun. 2015, arxiv.org/abs/1506.03134, 9 pages.

Wang et al., "Dynamic graph cnn for learning on point clouds," ACM Transactions on Graphics, Oct. 2019, 38(5):1-12.

Wang et al., "Improving graph attention networks with large margin-based constraints," CoRR, Oct. 2019, arXiv:1910.11945, 10 pages.

Xu et al., "How powerful are graph neural networks?," CoRR, Oct. 2018, arXiv:1810.00826, 17 pages.

Xu et al., "What can neural networks reason about?," CoRR, May 2019, arXiv:1905.13211, 18 pages.

Yan et al., "Neural execution engines: Learning to execute subroutines," CoRR, Jun. 2020, arXiv:2006.08084, 21 pages.

Zaheer et al., "Deep sets. In Advances in neural information processing systems," CoRR, Mar. 2017, arxiv.org/abs/1703.06114, 29 pages.

Zaremba et al., "Learning to execute," CoRR, Oct. 2014, arXiv:1410.4615, 25 pages.

(56)     References Cited

OTHER PUBLICATIONS

Zhao et al., "PairNorm: Tackling oversmoothing in gans." CoRR,
Sep. 2019, arXiv:1909.12223, 17 pages.

\* cited by examiner

PREDICTION SYSTEM 200

400

500

GENERATE THE MASKING OUTPUT FOR EACH NODE     502

GENERATE THE RELEVANCE SCORES FOR EACH NODE     504

UPDATE EACH EDGE POINTING FROM A NODE WITH MASKING OUTPUT EQUAL TO ZERO, ACCORDING TO THE RELEVANCE SCORES     506

GENERATING PREDICTION OUTPUTS USING DYNAMIC GRAPHS

CROSS-REFERENCE TO RELATED APPLICATION

This application claims priority under 35 USC § 119(e) to U.S. Patent Application Ser. No. 63/035,449, filed on Jun. 5, 2020, the entire contents of which are hereby incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can generate prediction outputs characterizing a set of entities.

As used throughout this document, an "embedding" can refer to an ordered collection of numerical values, e.g., a vector or matrix of numerical values.

According to a first aspect there is provided a method performed by one or more data processing apparatus for generating prediction outputs characterizing a set of entities, the method comprising: obtaining data defining a graph, comprising: (i) a set of nodes, wherein each node in the set of nodes represents a respective entity from the set of entities, (ii) a current set of edges, wherein each edge in the current set of edges connects a pair of nodes, and (iii) a respective current embedding of each node; at each of a plurality of time steps: updating the respective current embedding of each node of the graph, comprising processing data defining the graph using a graph neural network; and updating the current set of edges of the graph based at least in part on the updated embeddings of the nodes of the graph; and at one or more of the plurality of time steps: generating a prediction output characterizing the set of entities based on the current embeddings of the nodes of the graph.

In some implementations, updating the current set of edges of the graph based at least in part on the updated embeddings of the nodes of the graph comprises: for each of a plurality of pairs of nodes in the graph comprising a respective first node and a respective second node, determining a relevance score between the first node and the second node based on the updated embeddings of the first node and the second node; and updating the current set of edges of the graph based at least in part on the relevance scores between the pairs of nodes in the graph.

In some implementations, determining the relevance score between the first node and the second node based on the updated embeddings of the first node and the second node comprises: processing the updated embedding of the first node in accordance with a set of query parameters to generate a query embedding of the first node; processing the updated embedding of the second node in accordance with a set of key parameters to generate a key embedding of the second node; and determining the relevance score between the first node and the second node based on a similarity measure between: (i) the query embedding of the first node, and (ii) the key embedding of the second node.

In some implementations, the similarity measure between: (i) the query embedding of the first node, and (ii) the key embedding of the second node, comprises an inner product of: (i) the query embedding of the first node, and (ii) the key embedding of the second node.

In some implementations, the current set of edges includes a predefined set of static edges and a current set of dynamic edges, and at each of the plurality of time steps, updating the current set of edges of the graph based at least in part on the relevance scores between pairs of nodes in the graph comprises updating only the current set of dynamic edges based on the relevance scores between pairs of nodes in the graph.

In some implementations, the set of static edges is empty.

In some implementations, the set of static edges includes one or more edges.

In some implementations, updating the current set of dynamic edges based on the relevance scores between pairs of nodes in the graph comprises, for each given first node of the graph: determining that a relevance score between the given first node and a given second node is higher than a relevance score between the given first node and any other node other than the given second node; and adding an edge connecting the given first node to the given second node to the current set of dynamic edges.

In some implementations, the method further comprises removing one or more edges from the current set of dynamic edges prior to adding any edges to the current set of dynamic edges.

In some implementations, removing one or more edges from the current set of dynamic edges comprises removing every edge from the current set of dynamic edges.

In some implementations, at each of the plurality of time steps, the updated set of dynamic edges includes a predefined number of dynamic edges.

In some implementations, the predefined number of dynamic edges is equal to a number of nodes in the graph.

In some implementations, the method further comprises: processing an input comprising the updated embeddings of the nodes of the graph to generate a masking output; determining, based on the masking output, that one or more edges in the current set of dynamic edges should not be removed from the current set of dynamic edges at the time step.

In some implementations, updating the respective current embedding of each node of the graph comprises: for each node in the graph, processing an input comprising the current embedding of the node using an encoder neural network to generate a feature representation of the node; and providing the respective feature representation of each node as an input to the graph neural network.

In some implementations, the method further comprises, for each node in the graph: receiving, at each time step, respective input features corresponding to the node; wherein the encoder neural network processes an input comprising both: (i) the current embedding corresponding to the node, and (ii) the input features corresponding to the node, to generate the feature representation corresponding to the node.

In some implementations, processing data defining the graph using the graph neural network comprises, for one or more nodes of the graph: processing respective feature representations of: (i) the node, and (ii) one or more other nodes that are connected to the node, in accordance with a plurality of graph neural network parameters to update the current embedding of the node.

In some implementations, generating a prediction output characterizing the set of entities based on the current embeddings of the nodes of the graph comprises: generating a pooled embedding by pooling current embeddings of the nodes of the graph; and processing the pooled embedding to generate the prediction output.

In some implementations, pooling the current embeddings of the nodes of the graph comprises summing the current embeddings of the nodes of the graph.

In some implementations, the current embeddings of the nodes of the graph and the current set of edges of the graph are updated in accordance with values of a set of parameters, and further comprising: updating the values of the set of parameters using gradients of an objective function that measures an error between: (i) the current set of edges of the graph, and (ii) a target set of edges of the graph, at each of the plurality of time steps.

In some implementations, the objective function further measures an error between: (i) the current set of masking outputs, and (ii) a target set of masking outputs, at each of the plurality of time steps.

In some implementations, the objective function further measures an error between: (i) the prediction outputs characterizing the set of entities, and (ii) target outputs characterizing the set of entities.

In some implementations, the target set of edges and target set of masking outputs at each of the plurality of time steps are generated using a disjoint-set union data structure.

In some implementations, at a first time step of the plurality of time steps, the current set of edges includes a respective edge connecting each node in the graph to itself.

In some implementations, at a first time step of the plurality of time steps, the respective current embedding of each node is a default embedding.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect, there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The system described in this specification can generate a prediction output characterizing a set of entities, e.g., atoms in a molecule or objects in a physical system. To this end, the system can generate a graph that includes a respective node corresponding to each entity, a set of edges where each edge corresponds to a connection between two entities, and a respective embedding of each node. At each of multiple time steps, the system can update the embeddings of the nodes in the graph using a graph neural network, and then dynamically update the set of edges of the graph based on the updated node embeddings. The system can generate prediction outputs characterizing the set of entities at one or more time steps by processing the current node embeddings. By generating prediction outputs based on a dynamic graph that can change at each time step, rather than, e.g., a static graph, the system described in this specification can generate prediction outputs more effectively, e.g., more accurately, and over fewer time steps. Generating prediction outputs over fewer time steps can enable the system to reduce consumption of computational resources (e.g., memory and computing power) relative to conventional systems, e.g., that use a static graph.

The system described in this specification can learn to generate "sparse" graphs, i.e., that include only a limited number of edges, e.g., that include a number of edges that is equal to the number of nodes in the graph. By using sparse graphs, the system described in this specification can consume fewer computational resources, e.g., than systems which use dense graphs (a graph which has close to the maximal number of edges, i.e., a graph with has each node connected to each other node).

The system described in this specification can be trained to update the graph at each time step by imitating graph updates, e.g., adding an edge to or removing an edge from a graph, performed by conventional data structures such as disjoint-set union data structures or link/cut trees. Imitating graph updates performed by conventional data structures can enable the system to be pre-trained, using supervised learning techniques, to mimic the operations performed by conventional data structures. The system can then be subsequently trained to perform other tasks, e.g., generate a prediction output characterizing the set of entities. Pre-training the system to imitate graph updates performed by conventional data structures can allow the system to be trained to perform subsequent tasks over fewer training time steps (thereby reducing computational resource consumption), and can improve the robustness and generalizability of the system.

The system described in this specification can be trained using supervised learning techniques to use a masking mechanism to update only select portions the graph at each time step.

Using a masking mechanism can enable the system to use fewer computational resources to perform tasks, e.g., generate a prediction output characterizing the set of entities, e.g., by updating only a subset of the set of edges at each time step. Using a masking mechanism can also enable the system to have improved generalizability to out-of-distribution data sets, such as larger sets of entities than were used to train the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
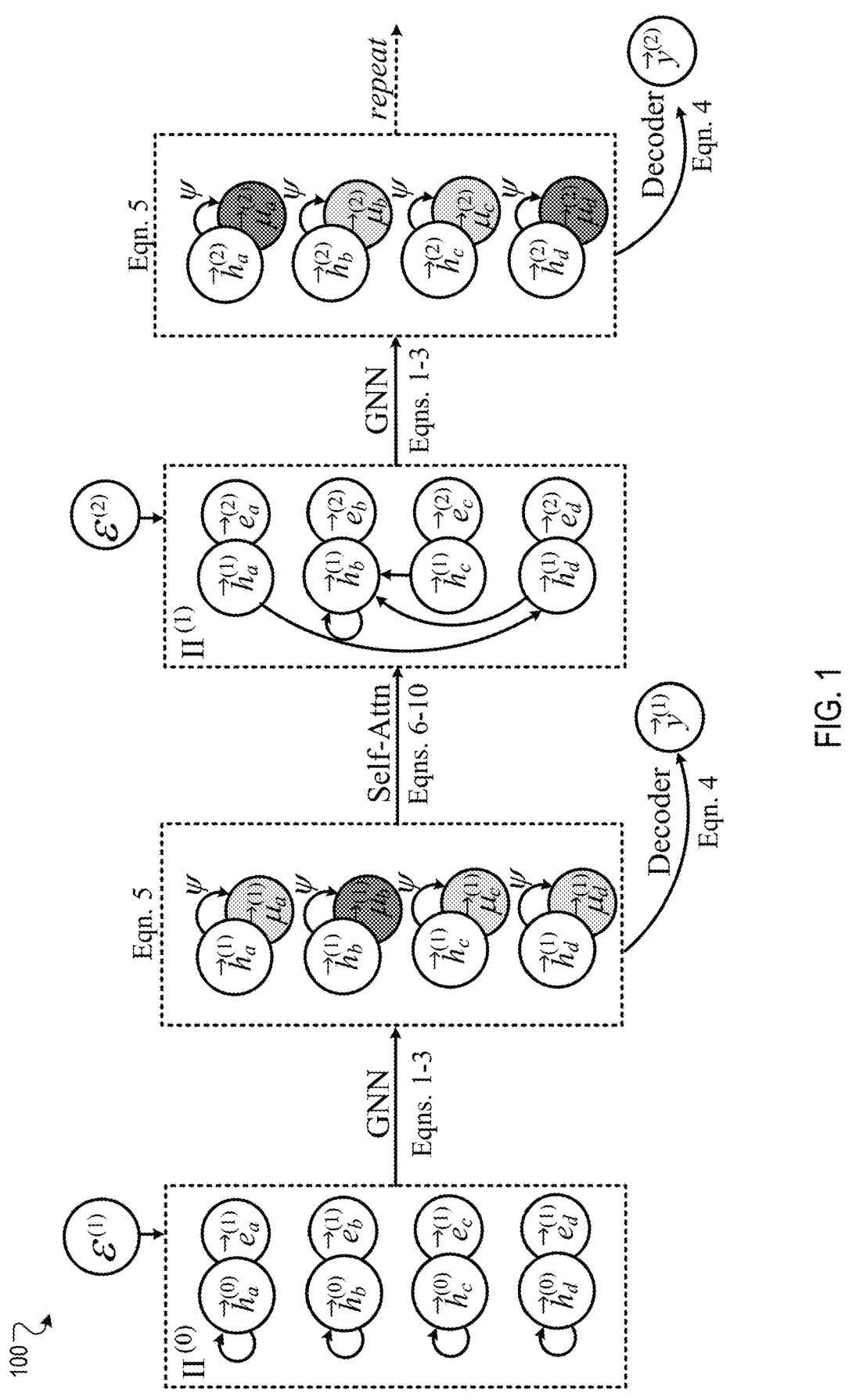
FIG. 1 is a diagram of an example data flow illustrating the operations performed by a prediction system.

FIG. 1 shows a diagram of an example data flow 100 illustrating the operations performed by a prediction system. An example of a prediction system, e.g., prediction system 200, that can perform the operations of data flow 100 is described in more detail below with reference to the description of FIG. 2.

The prediction system processes data defining a graph which represents a set of entities to generate a prediction output characterizing the set of entities, e.g., a classification output, or a regression output. A classification output can include a respective score for each class in a set of possible classes, where the score for a class can define a likelihood that the set of entities represented by the graph are included in the class. A regression output can include one or more numerical values, each drawn from a continuous range of values, that characterize the set of entities represented by the graph.

The data representing the graph includes data defining a set of nodes where each node represents an entity in the set of entities, a set of edges where each edge connects a pair of nodes, and a respective embedding for each node.

The graph can be a sparse graph that includes only a limited number of edges, e.g., a number of edges linear in the number of nodes. The edges can be either directed or undirected, i.e., can point from a first node to a second node, or be bidirectional. The set of edges can include a subset of predefined static edges and a subset of dynamic edges, where the static edges cannot be modified by the system and the dynamic edges can be modified by the system at each time step.

The system described herein is widely applicable and is not limited to one specific implementation. However, for illustrative purposes, a small number of example implementations are described below.

In some implementations, each entity can be a respective atom in a molecule, and the prediction outputs can characterize one or more predicted properties of the molecule, e.g., the energy required to break up the molecule, which can be represented, e.g., as a numerical value measured in joules.

In some implementations, each entity can be an object in a physical system, and the prediction outputs can characterize a respective predicted future state of each object in the physical system, e.g., a respective position and/or velocity of each of the objects in the physical system, e.g., measured in meters and meters per second, respectively.

In some implementations, each entity can represent a point in a point cloud (e.g., generated by a lidar or radar sensor), and the prediction output can characterize an object represented by the point cloud represented as, e.g., a collection of scores representing respective classes, where each score is the likelihood that the set of entities represented by the graph are included in the class.

In some implementations, each entity can be a word in a portion of text, and the prediction output can characterize, e.g., a sentiment expressed in the portion of text (e.g., positive, negative, or neutral), represented as, e.g., a set of respective likelihoods for each classification.

In some implementations, each entity can be a portion of an image (e.g., a pixel or a region of the image), and the prediction output can characterize, e.g., a class of object depicted in the image represented as, e.g., a set of respective likelihoods for each class.

In some implementations, each entity can represent a node in a dynamically connected graph, and the prediction output can characterize, e.g., dynamic graph connectivity, i.e., if two specified entities are connected in the graph at the current time step using, e.g., a binary $\{0,1\}$ prediction output.

In some implementations, each entity can represent an agent (e.g., a pedestrian, bicyclist, vehicle, etc.) or an element of an environment (e.g., traffic lights, traffic signs, road lanes, etc.) in the vicinity of a partly- or fully-autonomous vehicle. The prediction output can characterize, e.g., a respective future trajectory of one or more of the agents represented by nodes in the graph. For example, the prediction output can characterize a respective likelihood that an vehicle agent represented by a node in the graph will one or more possible driving decisions, e.g., going straight, changing lanes, turning left, or turning right.

In some implementations, each entity can represent a node in a power grid, where each edge corresponds to power lines between a pair of nodes in the power grid, and the prediction output can characterize properties of the power grid, e.g., whether certain nodes in the power grid are connected.

The system described in this specification can generate a prediction output characterizing a set of entities, e.g., atoms in a molecule or objects in a physical system. To this end, the system can generate a graph that includes a respective node corresponding to each entity, a set of edges where each edge corresponds to a connection between two entities, and a respective embedding of each node. At each of multiple time steps, the system can update the embeddings of the nodes in the graph using a graph neural network, and then dynamically update the set of edges of the graph based on the updated node embeddings. The system can generate prediction outputs characterizing the set of entities at one or more time steps by processing the current node embeddings.

Each node in the graph is associated with a respective embedding and a respective subset of the set of edges (i.e., the subset of edges which point from the node to another node in the graph) that are updated at each time step and which can characterize the current state of the node. The system can optionally receive as input at each time step a node input feature for each node. The node input feature can be a set of one or more values characterizing one or more properties of the entity (e.g., a vector of numerical values), which can, e.g., be used to represent changes to a dynamic graph. For example, if certain nodes in the graph represent agents in an environment in the vicinity of a partly- or fully-autonomous vehicle, then each of these nodes can receive a node input feature at each time step representing an updated position of the corresponding agent in the environment, e.g., represented by a two-dimensional (2D) coordinate in any appropriate coordinate system. The prediction system can leave the node input features unspecified, e.g., by leaving each node input feature as, e.g., a vector of zeros for each time step, to simulate a system without any explicit operations performed on it.

The prediction system can initialize the current embedding of each node at time step (0) with a default value for each node embedding $h_i^{(0)}$, e.g., a vector of all zeros. Optionally, the system can initialize the node embedding for each node to characterize the entity being represented by the node. For example, if the graph represents an image, such that each node represents a respective pixel in the image, then the node embedding for a pixel can be initialized, e.g., based on an RGB color vector of the pixel. The current node embedding for each node can implicitly characterize properties of the entity represented by the embedding, e.g., properties relevant to the prediction task. With reference to the example of FIG. 1, each node is notated with a letter, in particular a, b, c, and d, and each node is initialized with a respective embedding $h_i^{(0)}$, in particular $h_a^{(0)}$, $h_b^{(0)}$, $h_c^{(0)}$, and $h_d^{(0)}$, respectively.

The prediction system can initialize the current set of edges at time step (0) with a default set of dynamic edges, e.g., a set of edges where each node points only to itself. The default set of edges can also optionally include a set of predefined static edges which the system cannot modify. The current set of edges can be represented by an adjacency matrix $\Pi^{(t)}$, e.g., a square binary matrix of zeros and ones with dimensionality equal to the number of nodes, where $\Pi_{ij}^{(t)}=1$ represents an edge pointing from node i to node j (a "connection") and $\Pi_{ij}^{(t)}=0$ represents the lack of an edge pointing from node i to node j. An edge can be directed or undirected, i.e., the edge can point from one node to another node, or an edge can be a connection between two nodes with no sense of direction. With reference to the example of FIG. 1, the system initializes the adjacency matrix $\Pi^{(0)}$ with a set of edges such that each node points only to itself (e.g., a to a, b to b, etc.), as shown by the set of arrows pointing from each node to itself.

At each time step, the system can generate the updated node embeddings $\{h_i^{(t)}\}$ by processing the current node embeddings $\{h_i^{(t-1)}\}$, the current edge set $\Pi^{(t-1)}$, and optionally the input node features $\varepsilon^{(t)}=\{e_i^{(t)}\}$ using a graph neural network ("GNN"). The node input features for a node can represent any appropriate data affecting the state of the node at the time step. With reference to the example of FIG. 1, the system receives as input the node input features for each node, in particular $\varepsilon^{(1)}=\{e_a^{(1)}, e_b^{(1)}, e_c^{(1)}, e_d^{(1)}\}$, then subsequently processes the node input features $\{e_i^{(1)}\}$, current node embeddings $\{h_i^{(1)}\}$, and current set of edges represented by the adjacency matrix $\Pi^{(0)}$ using a graph neural network ("GNN") to generate the updated embedding $h_i^{(1)}$ for each node, in particular $\{h_a^{(1)}, h_b^{(1)}, h_c^{(1)}, h_d^{(1)}\}$.

A graph neural network can refer to a neural network that processes the data representing a graph, including a respective node embedding for each node in the graph and data representing the edges in the graph, to update the respective node embedding associated with each node in the graph. An example of operations that can be performed by a graph neural network and of architectures that a graph neural network can have are further described with reference to the description of FIG. 3 below.

At each time step, the system can optionally process the updated node embeddings $\{h_i^{(t)}\}$ to generate a prediction output $y^{(t)}$ using a decoder neural network ("decoder"). The prediction output can characterize one or more properties of the set of entities represented by the graph. With reference to the example of FIG. 1, the system processes the updated node embeddings $\{h_i^{(1)}\}$ using a decoder neural network ("decoder") to generate a prediction output $y^{(1)}$ characterizing the set of entities represented by the graph. An example of neural network architectures that the decoder neural network can have is further described with reference to the description of FIG. 4 below.

At each time step, the system can generate an updated edge set $\Pi^{(t)}$ using a sequence of operations. In particular, the system can generate a masking output $\mu_i^{(t)}$ for each node, e.g., a binary masking output $\{0,1\}$, then subsequently update the edge set according to the masking output, e.g., update each edge pointing from a node with masking output equal to zero.

At each time step, the system can generate a masking output $\mu_i^{(t)}$, e.g., $\{0,1\}$, for each node using a masking network $\psi$ to process the respective embedding of the node $h_i^{(t)}$. The masking output can characterize whether the system can update the edges pointing from respective node (e.g., if the masking output is zero) or maintain the current edges pointing from the node (e.g., if the masking output is one). With reference to the example of FIG. 1, the system generates a respective masking output for each node $\mu_i^{(1)}$ (in particular $\mu_a^{(1)}$, $\mu_b^{(1)}$, $\mu_c^{(1)}$, $\mu_d^{(1)}$) using a masking neural network $\psi$ to process the respective embedding of the node $h_i^{(1)}$. Nodes with respective masking output equal to one are indicated using dark grey, while nodes with respective masking output equal to zero are indicated using light grey. An example of a neural network architectures that the masking neural network can have is further described with reference to the description of FIG. 5 below.

At each time step, the system can generate the updated edge set $\Pi^{(t)}$ using a self-attention operation to process the updated node embeddings $\{h_i^{(t)}\}$, the masking outputs $\{\mu_i^{(t)}\}$, and current edge set $\Pi^{(t-1)}$. The system can update the edges in the current edge set which point from nodes with respective masking output equal to zero, in accordance with the self-attention operation. The system can retain the edges from the current edge set unaltered in the updated edge set which point from the nodes with respective masking output equal to one. With reference to the example of FIG. 1, the system generates an updated edge set $\Pi^{(1)}$ using a self-attention ("self-attn") operation to update the edges from nodes with masking output equal to zero, indicated using light grey, as shown by the new arrows pointing from node to node (in particular arrows pointing from a to d, c to b, d to b). The system retains the edges in the current edge set for the updated edge set from nodes with masking output equal one, indicated using dark grey (in particular the arrow from b to b). An example of the operations that can be performed by a self-attention operation is described in further detail with respect to the description of FIG. 5 below.

The system can repeat these operations until a specified termination criterion is satisfied, e.g., a predefined number of time steps have been performed. The example data flow of a prediction system shown in FIG. 1 shows two time steps (in particular time steps (1) and (2)) from a set of time steps.

Figure 2:
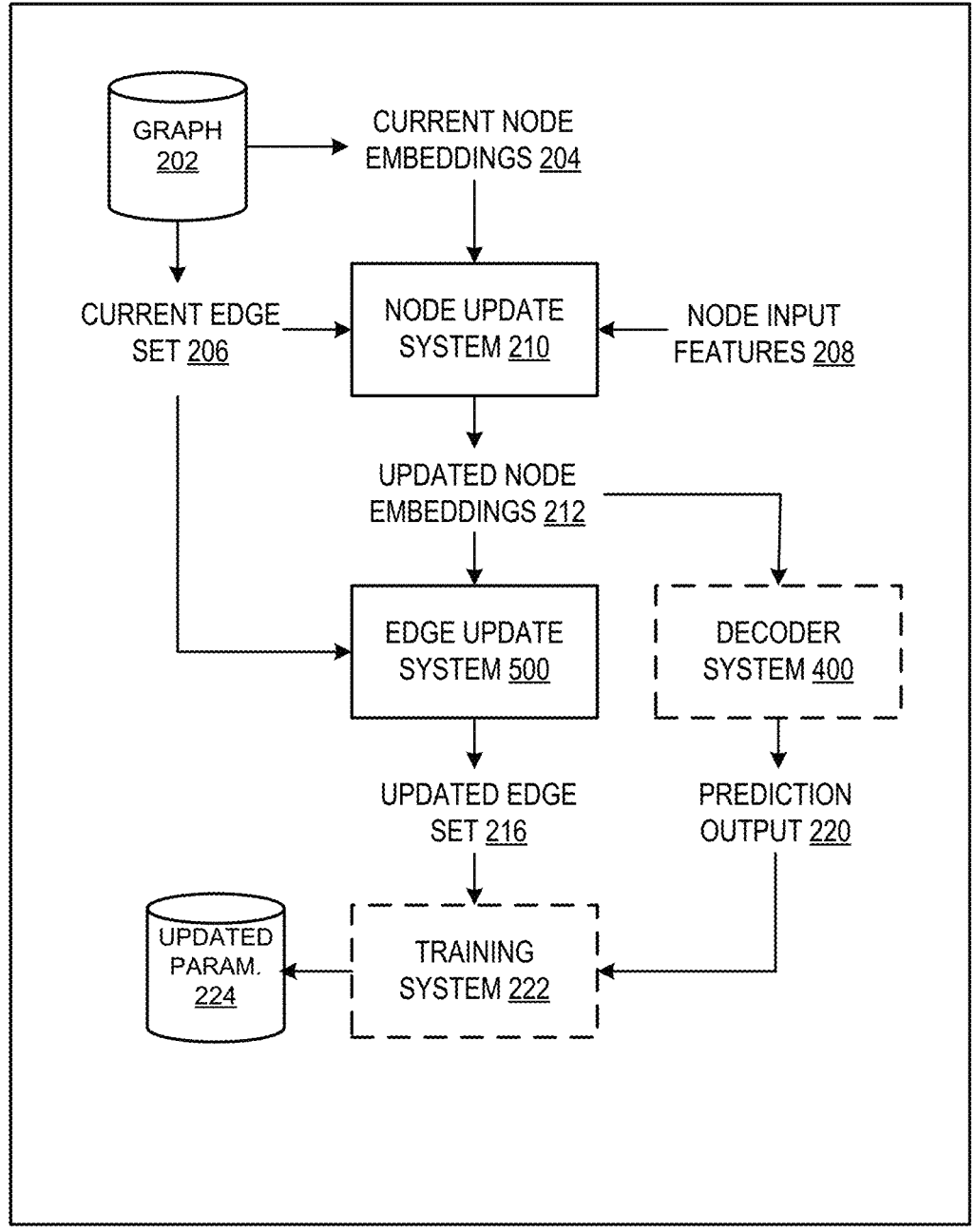
FIG. 2 is a block diagram of an example prediction system.

FIG. 2 shows an example prediction system 200. The prediction system 200 is an example of a system implemented as computer programs on one or more computers in one or more locations in which the systems, components, and techniques described below are implemented.

The prediction system 200 can process data defining a graph 202 to generate one or more prediction outputs 220, in particular, by repeatedly updating the current node embeddings 204 and current edge set 206 corresponding to the graph 202, as will be described in more detail below.

The prediction system 200 can be configured to process any appropriate graph, e.g., the graph 202. For example, the graph 202 can characterize a set of entities, e.g., atoms in a molecule.

The prediction system 200 can be configured to generate any appropriate prediction output, e.g., prediction output 220. For example, the prediction output 220 can characterize one or more predicted properties of the molecule, e.g., an energy required to break the bonds in the molecule.

The graph 202 can have any appropriate graph structure that enables it to perform its described function, i.e., representing a set of entities. For example, the graph can include a set of nodes, each node corresponding to an entity from a set of entities, and a set of edges, each edge corresponding to a connection between a pair of nodes (i.e., a connection between a pair of entities from the set of entities). The set of edges can include a static set of edges and a dynamic set of edges, i.e., a set of edges which cannot be modified by the system and a set of edges which can be modified by the system at each time step, respectively. The static edge set can contain, e.g., no edges, or one or more static edges. The static set of edges can represent a static structure of the set of entities, e.g., the bonds in a molecule. The dynamic edges can then augment the static edges, e.g., to facilitate more flexible information flow, or to learn deviations from the initial structure. For the following discussion, each reference to updating the current edge set is a change to a dynamic edge set, not a static edge set.

The prediction system 200 can optionally receive as input at each time step node input features 208 for each node. The node input features of each node can be a set of one or more values characterizing one or more properties of the respective node. The prediction system can process the data from graph 202 and optionally the node input features 208 at each of multiple time steps to generate a prediction output 220 at one or more of multiple time steps. In some cases, each node input feature can be a vector of one or more numerical values representing one or more features of the entity represented by the node. Generally, the prediction output 220 can be represented as a collection of numerical values, e.g., as a vector or matrix of numerical values.

The prediction system 200 can optionally generate a prediction output 220 at one or more time steps by processing the current edge set 206, the current node embeddings 204, and the node input features 208 at each of multiple time steps using the node update system 210, the decoder system 400, and the edge update system 500, each of which is described in more detail below.

At each time step, the node update system 210 generates the updated node embeddings 212 by processing the current edge set 206, the current node embeddings 204, and optionally the node input features 208. For example, the node update system 210 can process each current node embedding and optionally each node input feature to generate a respective node feature representation (e.g., a collection of ordered numerical values, such as a vector or a matrix of numerical values) for each node. For each node in the set of nodes, the node update system can process the current set of edges to determine which nodes are in the particular node's "neighborhood" (i.e., to determine which nodes are connected to the particular node). The system can then generate the respective updated node embedding for each node by processing the node feature representation of the particular node and the node feature representations of each respective node in the particular node's "neighborhood" (i.e., each node connected to the particular node). An example process for generating the updated node embeddings is described in more detail with reference to FIG. 3.

At one or more of multiple time steps, the decoder system 400 can optionally generate the prediction output 220 using the updated node embeddings 212 in a sequence of operations. For example, the decoder system 400 can generate a pooled embedding of the node embeddings using a permutation-invariant aggregator operation, e.g., a summation or maximization operation, and process the pooled embedding using a decoder neural network to generate the prediction output 220. An example process for generating the prediction output is described in more detail with reference to FIG. 4.

At each time step, the edge update system 500 generates the updated edge set 216 by processing the updated node embeddings 212 and the current edge set 206. For example, the edge update system 500 can process each updated node embedding to generate a set of relevance scores and a masking output for each node. The edge update system 500 can process the masking outputs to determine which edges from the current edge set to keep and which to replace, then update the edges designated for replacement based on the relevance scores. An example process for updating the edge set is described in more detail with reference to FIG. 5.

The system can be trained using the training system 222. At one or more of multiple time steps, the training system 222 can apply "teacher-forcing" to update the current edge set and masking output using a target edge set of the current time step and a target masking output of the current time step, respectively. The target edge set and the target masking output at each time step can be determined, e.g., using a data structure such as a disjoint-set union data structure, as will be described in more detail below. Ensuring the next time step begins from the ground-truth information with respect to the edge set and masking outputs can reduce the system compounding errors from earlier time steps, enabling a more stable training, converging faster and using fewer computational resources. After the final time step, the training system 222 can generate updated parameters 224 (i.e., updated parameters used to generate the updated edge set and updated node embeddings) by backpropagating the gradients of an objective function. An example process for applying "teacher-forcing" and an example process for updating the parameters used to update the node embeddings and edge set using the gradient of an objective function are discussed in further detail below with respective to the description of FIG. 3.

Figure 3:
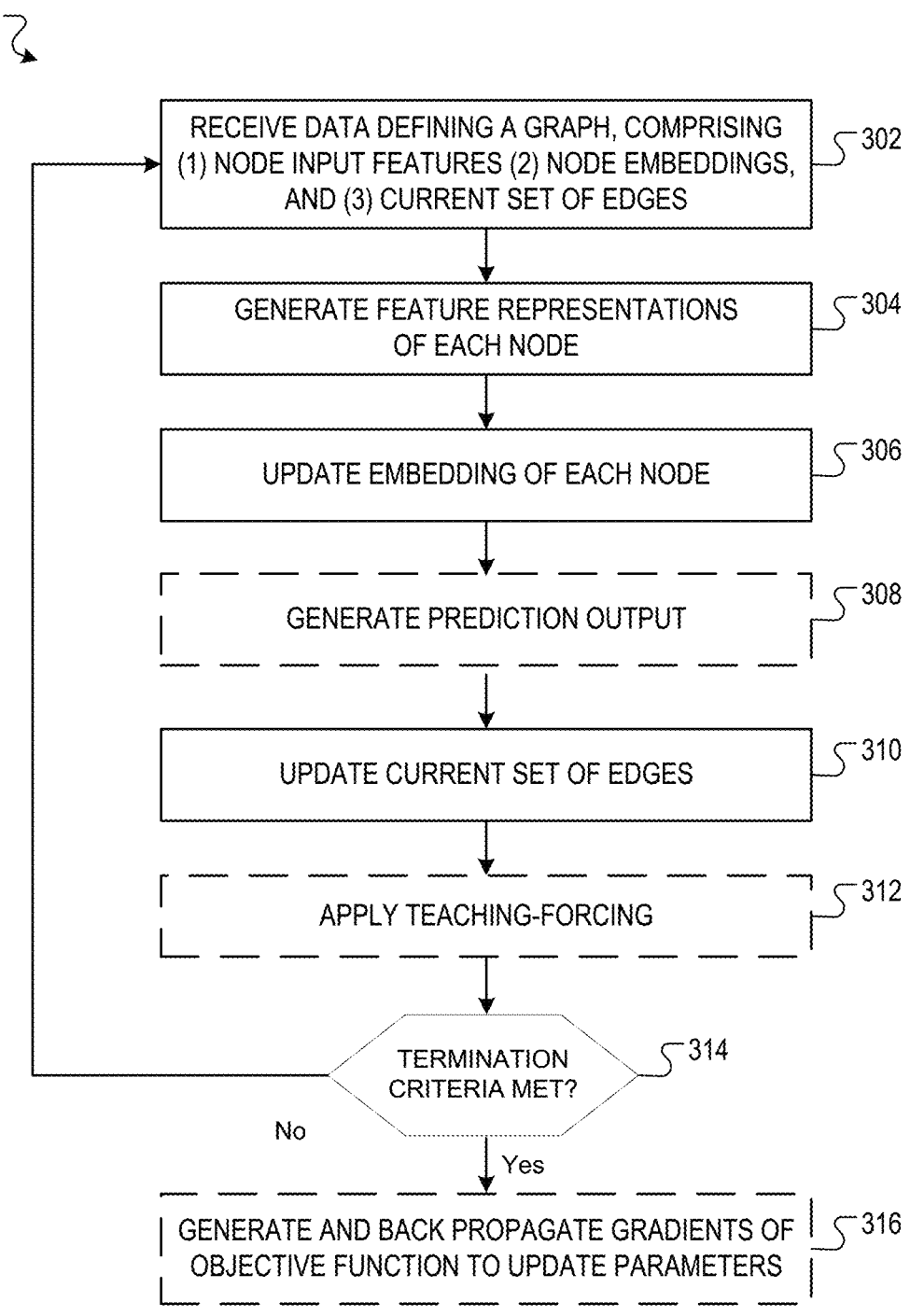
FIG. 3 is a flow diagram of an example process for generating prediction outputs.

FIG. 3 is a flow diagram of an example process for generating prediction outputs using dynamic graphs. For convenience, the process 300 will be described as being performed by a system of one or more computers located in one or more locations. For example, a prediction system, e.g., the prediction system 200 of FIG. 2, appropriately programmed in accordance with this specification, can perform the process 300.

The steps of the process 300 are performed at each time step in a sequence of time steps. For convenience, the steps of the process 300 are described as being performed at a "current" time step.

The system obtains the data defining a graph, comprising an optional respective node input feature for each node, a current set of edges, and a respective current embedding of each node (302). The graph can represent a set of entities, where each node in the set of nodes represents an entity in a set of entities, e.g., atoms in a molecule, each edge in the set of edges represents a connection between a pair of entities, e.g., bonds in the molecule. The node input features can represent a measure of one or more quantities associated with the entity represented by each node, e.g., a collection of ordered numerical values, such as a vector or matrix of numerical values.

The system generates a respective feature representation of each node (304) by processing the respective input features of the node and the current embedding of the node using an encoder neural network. For example, the encoder network operation can be represented as, $$z_i^{(t)} = f\left(e_i^{(t)}, h_i^{(t-1)}\right),\tag{1}$$

where f represents the encoder neural network that processes a concatenation of the node input features for node i and the current node embedding for node i to generate the node feature representation of node i, i indexes the nodes, t indexes the time steps, $e_i^{(t)}$ represents the respective node input features for node i, $h_i^{(t-1)}$ represents the respective current node embedding for node i, and $z_i^{(t)}$ represents the respective node feature representation for node i. The node input features can represent, e.g., a collection of values characterizing each entity at the current time step (e.g., average traffic speed on each road).

The encoder neural network can have any appropriate neural network architecture that enables it to perform its described function, i.e., processing the input node features $e_i^{(t)}$ of each node and current node embedding $h_i^{(t-1)}$ of each node to generate a respective node feature representation $z_i^{(t)}$ for each node. In particular, each encoder neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

The system generates the updated node embeddings (306) by processing the current edge set and the node feature representations using a graph neural network. The graph neural network can process the set of edges to determine the "neighborhood" of each node (i.e., which other nodes are connected to the node), then process the node feature representation for the node and the node feature representations of each node in the respective node's "neighborhood" (i.e., of each node connected to the node). For example, the graph neural network operation can be represented as, $$H^{(t)} = P(Z^{(t)}, \Pi^{(t-1)}),\tag{2}$$

where P represents the graph neural network, t indexes the time steps, $Z^{(t)}$ represents the set of node feature representations, $\{z_i^{(t)}\}$, $\Pi^{(t-1)}$ represents the current set of edges as an adjacency matrix (which can include both static and dynamic edges, if a predefined set of static edges is specified), and $H^{(t)}$ represents the set of updated node embeddings $\{h_i^{(t)}\}$.

The graph neural network can have any appropriate neural network architecture that enables it to perform its described function, i.e., processing the node feature representations and current edge set to generate an updated node embedding for each node. In particular, each graph neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

For example, the graph neural network used to generate the each respective updated node embedding $h_i^{(t)}$, can be represented by, $$h_i^{(t)} = U\left(z_i^{(t)}, \max_{\Pi_{ji}^{(t-1)}=1} M(z_i^{(t)}, z_j^{(t)})\right),\tag{3}$$

where U and M are linear network layers, i indexes the nodes, t indexes the time steps, (.,.) indicates concatenation, and the max function is an element-wise maximization function that ranges over each index j for which there exists an edge from the $i^{th}$ node to the $j^{th}$ node (i.e., for each node j in the "neighborhood" of the node i) according to the adjacency matrix $\Pi_i^{(t-1)}$. Processing the output from the network M using an element-wise max function can generate a lower variance in the final result than other aggregator operations, e.g., summation.

The system optionally processes the updated node embeddings to generate the prediction output (308). In some cases, the system can generate the prediction output on a schedule based on the time step, e.g., every one, two, or ten time steps, which can enable, e.g., dynamic graph connectivity querying (i.e., is there a series of edges which connects two specific nodes?). In some cases, the system can generate the prediction output according to other predefined criteria, e.g. on the final time step, which can enable, e.g., predicting sentiment of a collection of words, e.g., in a sentence, or in a paragraph. The system generating the prediction output is described with further detail with reference to the description of FIG. 4 below.

The system can generate the updated edge set (310) using a sequence of operations to process the updated node embeddings and the current edge set. For example, the system can process the updated node embeddings to generate a respective set of relevance scores for each node and a respective masking output for each node. The system can process the respective masking output for each node to determine which edges from the current edge set to update in accordance with the relevance scores and which edges to keep unaltered, as will be described in further detail with reference to the descriptions of FIG. 5 below. Dynamically updating the edge set can enable the system to model dynamical graph systems, e.g., graphs for which the edge set is not static, and selectively updating the edges using a masking output can enable the system to be have greater generalizability to out-of-distribution data sets, such as larger data sets than the training data set.

The system can optionally apply "teacher-forcing" to update the edge set and masking output using the target edge set and target masking output (312). For example, the system can be corrected at the current time step so that the current edge set is set equal to the target edge set and the masking output is set equal to the target masking output. (Examples techniques for determining the target edge set and the target masking output are described in more detail below). The system uses the "teacher-forced" edge set and masking outputs to generate each update to the graph (e.g., updated edge set, updated node embeddings, and masking output) on the next time step. Ensuring the next time step begins from the ground-truth information with respect to the edge set and masking outputs can reduce the system compounding errors from earlier time steps, which can ensure a more stable training, converging faster and using fewer computational resources.

The system can then determine if the termination criteria have been met (314). For example, the termination criteria can comprise a single criterion of performing a minimum number of time steps. If the termination criteria have been not been met, the system loops back to step (302). If the termination criteria have been met, the system proceeds to the next step.

After the final time step, the system can optionally generate and backpropagate gradients of an objective function to update the parameters used to generate the updated node embeddings and updates edge set (316). For example, the system can update the parameters of the encoder neural network, graph neural network, decoder neural network, masking neural network, query transformation, and key transformation.

In one example, the objective function can measure an error between the generated prediction outputs characterizing the set of entities and the target outputs characterizing the set of entities at each appropriate time step, i.e. each time step a prediction output was generated. Optionally, the objective function can further measure errors between the current edge set and the target edge set at each time step, and between the current masking output and the target masking output at teach time step. The system can use any appropriate objective function to measure these respective errors (e.g., a cross-entropy loss function for the error between edge sets, a binary cross-entropy loss for the error between the masking outputs, and a squared-error loss function for regression prediction outputs or a cross-entropy loss function for classification outputs), and can generate and back-propagate the gradients of said objective function using any appropriate optimization method (e.g., stochastic gradient descent SGD', SGD with moment, or ADAM).

The system can generate a target edge set and a target masking output at each time step in any of a variety of ways. In one example, the system can generate the target edge set and the target masking output at each time step using a disjoint-set union (DSU) data structure. The DSU data structure maintains and dynamically updates a graph over a sequence of time steps based on an input received by the DSU data structure at each time step, e.g., that specifies two nodes in the DSU graph. (Generally, the DSU graph has the same number of nodes as the graph being processed by the system). The DSU data structure can also generate a numerical output at each time step based on the input received by the DSU data structure at the time step. Examples of DSU data structures are described in more detail with reference to: Petar Veličlović, et al., "Pointer graph networks," arXiv: 2006.06380v2, 18 Oct. 2020, which is incorporated herein by reference.

At each time step in a sequence of time steps, the system can provide an input to the DSU graph, e.g., that specifies two randomly selected nodes in the DSU graph, and the DSU data structure can update the DSU graph at the time step. The system can provide a respective input feature to each node of the graph, e.g., that defines the indices of the two randomly selected nodes of the DSU graph at the time step. The system can determine the target edge set for the time step to be the updated edge set of the DSU graph at the time step, the system can determine the target masking outputs to be defined by the set of edges in in the DSU graph that are updated at the time step, and the system can determine the target prediction output for the time step to be the numerical output generated by the DSU data structure at the time step.

Thus the system can be "pre-trained" to imitate graph update operations performed by a classical data structure, e.g., a DSU data structure (as described above) or a link/cut tree data structure. After being pre-trained, the system can be trained to perform a different prediction task (e.g., predicting the energy required to break the bonds in a molecule). Pre-training can enable the system to consume fewer computational resources during training (e.g., by converging under fewer training iterations) and improve the generalizability of the system (e.g., by enabling the system to generate better predictions on out-of-distribution data sets).

Figure 4:
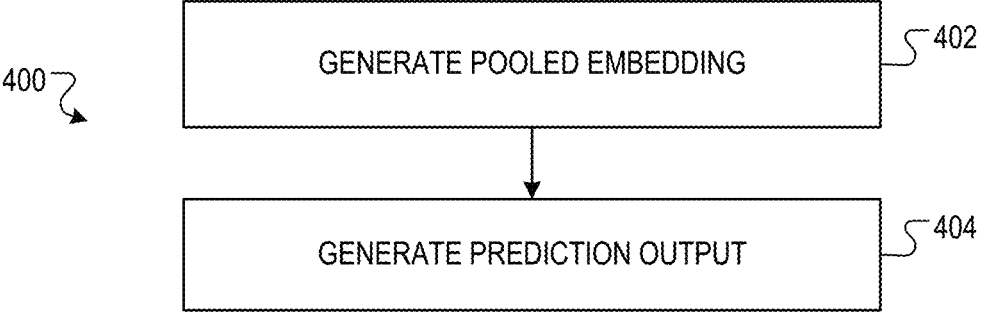
FIG. 4 is a flow diagram of an example process for processing the updated node embeddings to generate the prediction outputs.

FIG. 4 shows an example process for generating the prediction output. For convenience, the process 400 will be described as being performed by a system of one or more computers located in one or more locations. For example, a decoder system, e.g., the decoder system 400 of FIG. 2, appropriately programmed in accordance with this specification, can perform the process 400.

If the system is configured to generate a prediction output at the current time step, the system can generate the prediction output using a sequence of operations.

The system can generate a pooled embedding (402) using a pooling operation to process the updated node embeddings. The pooling operation can be any permutation-invariant aggregator operation, e.g. a summation or element-wise maximization operation.

The system can subsequently generate the prediction output (404) using a decoder neural network to process the pooled embeddings. For example, the system can generate the prediction output using the pooling operation and decoder neural network, represented as, $$y^{(t)} = g(\bigoplus_i z_i^{(t)}, \bigoplus_i h_i^{(t)}), \qquad (4)$$

where $y^{(t)}$ represents the prediction output, g represents the decoder network, (.,.) represents concatenation, $\bigoplus_i$ represents a permutation-invariant aggregator operation ("pooling operation"), over index i, $z_i^{(t)}$ represents the node feature representation of node i, $h_i^{(t)}$ represents the updated node embedding of node i, i indexes the nodes, and t indexes the time steps.

The decoder neural network can have any appropriate neural network architecture that enables it to perform its described function, i.e., processing the pooled embedding to generate a prediction output. In particular, the decoder neural network can have any appropriate types of neural network layers (e.g., fully-connected layers, attention-layers, etc.) in any appropriate numbers (e.g., 1 layer, 5 layers, or 25 layers), and connected in any appropriate configuration (e.g., as a linear sequence of layers).

The prediction output can characterize the set of entities, e.g., as a regression output (e.g., a vector or matrix of numerical values), such as the energy required to break bonds in a molecule, or a classification output (e.g., a set of respective likelihoods that the set of entities belong to certain classes), such as dynamic connectivity querying, i.e., if there exists a path between two specified entities.

Optionally, the system can generate the prediction output by processing fewer than all of the node embeddings of the nodes in the graph. For example, the system can process the node embedding for a single node to generate a prediction output relevant to the entity represented by the node. In an implementation where certain nodes in the graph represent agents in the vicinity of a partly- or fully-autonomous vehicle, the system can process the node embedding for a node representing an agent to generate a prediction output characterizing the future trajectory of the agent.

Figure 5:
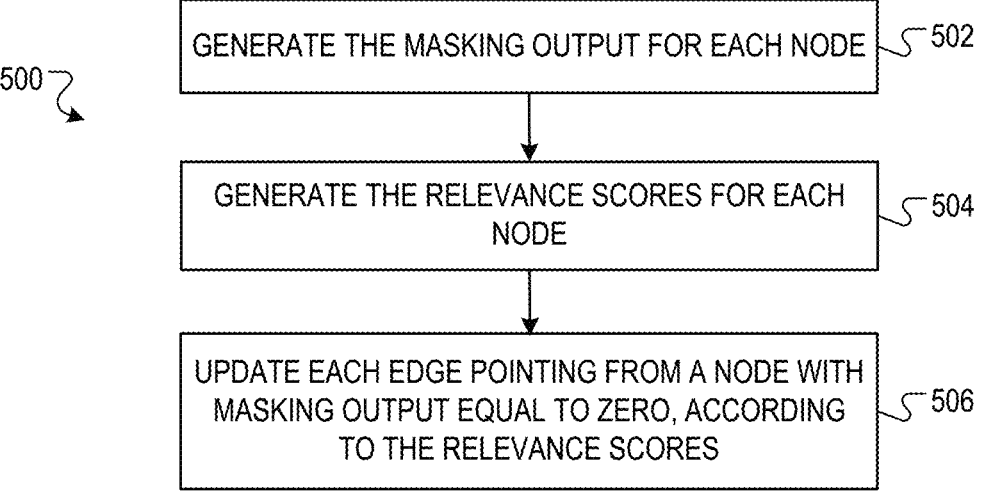
FIG. 5 is a flow diagram of an example process for updating a set of edges.

FIG. 5 shows an example process for updating the current edge set. For convenience, the process 500 will be described as being performed by a system of one or more computers located in one or more locations. For example, an edge update system, e.g., the edge update system 500 of FIG. 2, appropriately programed in accordance with this specification, can perform the process 500.

The system can generate a respective masking output for each node (502) by processing the respective node feature representation for the node and the respective node embedding for the node. For example, the system can generate the masking output for each node by using a masking neural network.

The masking network can have any appropriate neural network architecture that enables it to perform its described function, i.e., generating the masking output for each node by processing the respective node feature representation of the node and the respective updated node embedding of the node. In particular, the masking network can have any appropriate types of layers (e.g., fully-connected layers, attention-layers, etc.) in any appropriate numbers (e.g., 1 layer, 5 layers, or 25 layers), and connected in any appropriate configuration (e.g., as a linear sequence of layers).

For example, the masking network can process the respective embedding of a node and the respective feature representation of the node using any appropriate method that enables it to generate a respective masking output $\mu_i^{(t)}$ for the node, e.g., by processing their concatenation, as, $$\mu_i^{(t)} = \mathbb{1}_{\psi(z_i^{(t)}, h_i^{(t)}) > 0.5}, \tag{5}$$

where i indexes the nodes, t indexes the time steps, $z_i^{(t)}$ represents the node feature representation, $h_i^{(t)}$ represents the updated node embedding, the output activation function for the neural network $\psi$ is a sigmoid function, and the indicator function $\mathbb{1}$ returns one when $\psi(z_i^{(t)}, h_i^{(t)}) > 0.5$ and zero otherwise. In this particular implementation, the dynamic edges pointing from a node with masking output equal to one cannot be modified, while dynamic edges pointing from a node with masking output equal to zero can be modified. Generally, the system does not modify static edges.

The masking output can enable the system to better generalize to out-of-distribution data sets for prediction, performing better on larger data sets than were used in training.

The system can generate a respective set of respective relevance scores for each node (504) using an attention neural network to determine how to update the edges for the nodes specified by the masking output. Each score in a respective set of relevance scores for a node represents a similarity measure between the respective node embedding and each other node embedding, including the respective node embedding itself. For example, the relevance score engine can generate the similarity measure between a first node and a second node using a self-attention operation, e.g., by calculating the dot product of a query-key pair generated from the embeddings of the first and second nodes, respectively, as $$q_i^{(t)} = W_q h_i^{(t)}, \tag{6}$$

$$k_j^{(t)} = W_k h_j^{(t)}, \tag{7}$$

$$\alpha_{ij}^{(t)} = softmax(\langle q_i^{(t)}, k_j^{(t)} \rangle), \tag{8}$$

where $W_q$ and $W_k$ are learnable linear transformations (e.g., represented as matrices), i indexes the nodes, t indexes the time steps, $q_i^{(t)}$ is the query embedding of node i, $k_j^{(t)}$ is the key embedding of node j, $\langle .,. \rangle$ represents the dot product, the softmax function is taken over the j index, and the result $\alpha_{ij}^{(t)}$ represents the relevance score of node j to node i.

The system updates each edge pointing from a node with masking output equal to zero, according to the relevance scores (506).

For example, the system can retain the edges pointing from each node with masking output equal to one, so that each edge of the updated edge set pointing from a node with masking output equal to one is maintained, as represented by the first half of equation (9) below. The system can then update the edges from each node with masking output equal to zero according to the respective set of relevance scores corresponding to the node. The system can update the edge pointing from a node so that the updated edge points to the node with the highest respective relevance score, represented by the second half of equation (9), as, $$\tilde{\Pi}_{ij}^{(t)} = \mu_i^{(t)} \tilde{\Pi}_{ij}^{(t-1)} + (1 - \mu_i^{(t)}) \mathbb{1}_{j=argmax(\alpha_{ij}^{(t)})}, \tag{9}$$

where i and j index the nodes, t indexes the time steps, the adjacency matrix element $\tilde{\Pi}_{ij}^{(t)}$ represents the edge from node i to node j, $\mu_i^{(t)}$ represents the masking output, and the indicator function $\mathbb{1}$ returns one when the index j corresponds to the maximum respective relevance score for node i, or zero otherwise. The system can also symmetrize the edges, so that node j being most relevant to node i results in adding both edges i to j and j to i, as, $$\prod_{ij}^{(t)} = \tilde{\prod}_{ij}^{(t)} \vee \tilde{\prod}_{ji}^{(t)}, \tag{10}$$

where the adjacency matrix $$\tilde{\prod}_{ij}^{(t)}$$

represents the updated connections before symmetrization, the $\vee$ represents the logical disjunction operator used to symmetrize the adjacency matrix.

The system updating the edge set can enable the system to better represent the set of entities, and can enable to system to model dynamical graph connectivity, where edges can be removed or added at each step in time, e.g., such as connections between roads opening and closing. Symmetrizing the adjacency matrix, while not necessary, can improve the performance and generalizability of the system by softening the impact of the mistaken removal of critical edges.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method performed by one or more data processing apparatus for generating prediction outputs characterizing a set of entities, the method comprising:

obtaining data defining a graph, comprising: (i) a set of nodes, wherein each node in the set of nodes represents a respective entity from the set of entities, (ii) a current set of edges, wherein each edge in the current set of edges connects a pair of nodes, and (iii) a respective current embedding of each node;

at each of a plurality of time steps:

updating the respective current embedding of each node of the graph, comprising processing data defining the graph using a graph neural network to update the respective current embedding of each node of the graph using feature representations of neighboring nodes identified based on the current set of edges at the time step;

updating the current set of edges of the graph based at least in part on the updated embeddings of the nodes of the graph, comprising:

processing the updated embeddings of the nodes in the graph, using a set of neural network parameters that have been trained by a machine learning training technique, to generate (i) a respective relevance score between each of a plurality of pairs of nodes in the graph, and (ii) a respective masking output for each node that characterizes whether to update edges connected to the node in the current set of edges; and updating the current set of edges of the graph based on the relevance scores and the masking outputs, wherein updating the current set of edges comprises:

determining nodes with edges designated for replacement based on the masking outputs;

updating edges belonging to each node designated for replacement by adding one or more edges to the graph, or removing one or more edges from the graph, or both based on the set of relevance scores; and after updating the current set of edges of the graph, providing the updated graph for processing at a next time step; and at one or more of the plurality of time steps:

generating a prediction output characterizing the set of entities based on the current embeddings of the nodes of the graph.

2. The method of claim 1, wherein processing the updated embeddings of the nodes in the graph, using the set of neural network parameters that have been trained by a machine learning training technique, to generate the respective relevance score between each pair of nodes in the plurality of pairs of nodes in the graph comprises:

for first node and a second node in the pair of nodes, determining the relevance score between the first node and the second node based on the updated embeddings of the first node and the second node.

3. The method of claim 2, wherein the set of neural network parameters that have been trained by a machine learning training technique comprises a set of query parameters and a set of key parameters, and wherein determining the relevance score between the first node and the second node in the pair of nodes based on the updated embeddings of the first node and the second node comprises:

processing the updated embedding of the first node in accordance with the set of query parameters to generate a query embedding of the first node;

processing the updated embedding of the second node in accordance with the set of key parameters to generate a key embedding of the second node; and determining the relevance score between the first node and the second node based on a similarity measure between: (i) the query embedding of the first node, and (ii) the key embedding of the second node.

4. The method of claim 3, wherein the similarity measure between: (i) the query embedding of the first node, and (ii) the key embedding of the second node, comprises an inner product of: (i) the query embedding of the first node, and (ii) the key embedding of the second node.

5. The method of claim 1, wherein the current set of edges includes a predefined set of static edges and a current set of dynamic edges, and wherein updating the current set of edges of the graph based on the relevance scores and the masking output comprises comprises updating only the current set of dynamic edges for nodes with edges designated for replacement based on the relevance scores between pairs of nodes in the graph.

6. The method of claim 5, wherein updating the current set of dynamic edges for nodes with edges designated for replacement based on the relevance scores between pairs of nodes in the graph comprises, for each given first node of the graph:

determining that a relevance score between the given first node and a given second node is higher than a relevance score between the given first node and any other node other than the given second node; and adding an edge connecting the given first node to the given second node to the current set of dynamic edges.

7. The method of claim 6, further comprising removing one or more edges from the current set of dynamic edges prior to adding any edges to the current set of dynamic edges.

8. The method of claim 5, wherein at each of the plurality of time steps, the updated set of dynamic edges includes a predefined number of dynamic edges.

9. The method of claim 1, wherein updating the respective current embedding of each node of the graph comprises:

for each node in the graph, processing an input comprising the current embedding of the node using an encoder neural network to generate a feature representation of the node; and providing the respective feature representation of each node as an input to the graph neural network.

10. The method of claim 9, further comprising, for each node in the graph:

receiving, at each time step, respective input features corresponding to the node;

wherein the encoder neural network processes an input comprising both: (i) the current embedding corresponding to the node, and (ii) the input features corresponding to the node, to generate the feature representation corresponding to the node.

11. The method of claim 9, wherein processing data defining the graph using the graph neural network to update the respective current embedding of each node of the graph using feature representations of neighboring nodes identified based on the current set of edges at the time step comprises, for one or more nodes of the graph:

processing respective feature representations of: (i) the node, and (ii) one or more other nodes that are connected to the node, in accordance with a plurality of graph neural network parameters to update the current embedding of the node.

12. The method of claim 1, wherein generating a prediction output characterizing the set of entities based on the current embeddings of the nodes of the graph comprises:

generating a pooled embedding by pooling current embeddings of the nodes of the graph; and processing the pooled embedding to generate the prediction output.

13. The method of claim 1, wherein the current embeddings of the nodes of the graph and the current set of edges of the graph are updated in accordance with values of a set of parameters, and further comprising:

updating the values of the set of parameters using gradients of an objective function that measures respective errors between:

(i) the current set of edges of the graph, and (ii) a target set of edges of the graph, at each of the plurality of time steps; and (i) the masking outputs for each node in the graph, and (ii) target masking outputs for each node in the graph, at each of the plurality of time steps.

14. The method of claim 13, wherein the objective function further measures an error between: (i) the prediction outputs characterizing the set of entities, and (ii) target outputs characterizing the set of entities.

15. The method of claim 13, wherein the target set of edges and the target masking outputs at each of the plurality of time steps are generated using a disjoint-set union data structure.

16. The method of claim 1, wherein at a first time step of the plurality of time steps:

the current set of edges includes a respective edge connecting each node in the graph to itself; and the respective current embedding of each node is a default embedding.

17. The method of claim 1, wherein each entity in the set of entities is a respective atom in a molecule, and wherein the prediction output characterizes the energy required to break up the molecule.

18. The method of claim 1, wherein each entity in the set of entities is an object in a physical system, and wherein the prediction output characterizes a respective predicted future position of each of the objects in the physical system.

19. A system comprising:

one or more computers; and one or more storage devices communicatively coupled to the one or more computers, wherein the one or more storage devices store instructions that, when executed by the one or more computers, cause the one or more computers to perform operations for generating prediction outputs characterizing a set of entities, the operations comprising:

obtaining data defining a graph, comprising: (i) a set of nodes, wherein each node in the set of nodes represents a respective entity from the set of entities, (ii) a current set of edges, wherein each edge in the current set of edges connects a pair of nodes, and (iii) a respective current embedding of each node;

at each of a plurality of time steps:

updating the respective current embedding of each node of the graph, comprising processing data defining the graph using a graph neural network to update the respective current embedding of each node of the graph using feature representations of neighboring nodes identified based on the current set of edges at the time step;

updating the current set of edges of the graph based at least in part on the updated embeddings of the nodes of the graph, comprising:

processing the updated embeddings of the nodes in the graph, using a set of neural network parameters that have been trained by a machine learning training technique, to generate (i) a respective relevance score between each of a plurality of pairs of nodes in the graph, and (ii) a respective masking output for each node that characterizes whether to update edges connected to the node in the current set of edges; and updating the current set of edges of the graph based on the relevance scores and the masking outputs, wherein updating the current set of edges comprises:

determining nodes with edges designated for replacement based on the masking outputs;

updating edges belonging to each node designated for replacement by adding one or more edges to the graph, or removing one or more edges from the graph, or both based on the set of relevance scores; and after updating the current set of edges of the graph, providing the updated graph for processing at a next time step; and at one or more of the plurality of time steps:

generating a prediction output characterizing the set of entities based on the current embeddings of the nodes of the graph.

20. One or more non-transitory computer storage media storing instructions that when executed by one or more computers cause the one or more computers to perform operations for generating prediction outputs characterizing a set of entities, the operations comprising:

obtaining data defining a graph, comprising: (i) a set of nodes, wherein each node in the set of nodes represents a respective entity from the set of entities, (ii) a current set of edges, wherein each edge in the current set of edges connects a pair of nodes, and (iii) a respective current embedding of each node;

at each of a plurality of time steps:

updating the respective current embedding of each node of the graph, comprising processing data defining the graph using a graph neural network to update the respective current embedding of each node of the graph using feature representations of neighboring nodes identified based on the current set of edges at the time step;

updating the current set of edges of the graph based at least in part on the updated embeddings of the nodes of the graph, comprising:

processing the updated embeddings of the nodes in the graph, using a set of neural network parameters that have been trained by a machine learning training technique, to generate (i) a respective relevance score between each of a plurality of pairs of nodes in the graph, and (ii) a respective masking output for each node that characterizes whether to update edges connected to the node in the current set of edges; and updating the current set of edges of the graph based on the relevance scores and the masking outputs, wherein updating the current set of edges comprises:

determining nodes with edges designated for replacement based on the masking outputs;

updating edges belonging to each node designated for replacement by adding one or more edges to the graph, or removing one or more edges from the graph, or both based on the set of relevance scores; and after updating the current set of edges of the graph, providing the updated graph for processing at a next time step; and at one or more of the plurality of time steps:

generating a prediction output characterizing the set of entities based on the current embeddings of the nodes of the graph.

* * * * *